US009535251B2

(12) United States Patent
Liesecke et al.

(10) Patent No.: US 9,535,251 B2
(45) Date of Patent: Jan. 3, 2017

(54) HMD APPARATUS WITH ADJUSTABLE EYE TRACKING DEVICE

(71) Applicant: AIRBUS DEFENCE AND SPACE GMBH, Ottobrunn (DE)

(72) Inventors: Stephan Liesecke, Donauwörth (DE); Daniel Dreyer, München (DE); Franz Kocvara, Unterschleissheim (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 28 days.

(21) Appl. No.: 14/316,100

(22) Filed: Jun. 26, 2014

(65) Prior Publication Data

US 2015/0009574 A1 Jan. 8, 2015

(30) Foreign Application Priority Data

Jul. 3, 2013 (EP) .................................... 13174990

(51) Int. Cl.
*G02B 27/14* (2006.01)
*G02B 27/01* (2006.01)
*G06K 9/00* (2006.01)

(52) U.S. Cl.
CPC ......... *G02B 27/0172* (2013.01); *G02B 27/017* (2013.01); *G06K 9/00604* (2013.01); *G02B 2027/014* (2013.01); *G02B 2027/0138* (2013.01); *G02B 2027/0187* (2013.01)

(58) Field of Classification Search
CPC .............. G02B 2027/0138; G02B 2027/014; G02B 2027/0187; G02B 27/017; G02B 27/0172; G06K 9/00604

USPC ........................................................ 359/630
See application file for complete search history.

(56) References Cited

U.S. PATENT DOCUMENTS

| 4,852,988 | A | 8/1989 | Velez et al. |
| 5,481,622 | A | 1/1996 | Gerhardt et al. |
| 5,581,622 | A | 12/1996 | Sakurai |
| 6,433,760 | B1 | 8/2002 | Vaissie et al. |
| 6,572,282 | B1 * | 6/2003 | Okuley ................. F16M 11/10 248/140 |
| 2006/0274269 | A1 * | 12/2006 | Koest ..................... A61B 3/117 351/246 |
| 2012/0293773 | A1 * | 11/2012 | Publicover ............ A61B 5/162 351/210 |

FOREIGN PATENT DOCUMENTS

WO 2013/082387 A1 6/2013

* cited by examiner

*Primary Examiner* — Scott J Sugarman
*Assistant Examiner* — Vipin Patel
(74) *Attorney, Agent, or Firm* — Hoffmann & Baron, LLP

(57) ABSTRACT

An HMD apparatus with an imaging optical system for each one of the eyes of a user, which includes at least one display unit to be viewed by the respective eye, and with a device for the acquisition of the viewing direction of at least one eye within a field of view of the display unit by means of an eye camera, wherein the eye camera is provided with a camera holder, which can be adjusted in terms of a peripheral angle around a viewing central axis of the field of view and in terms of a setting angle with respect to the viewing central axis.

11 Claims, 2 Drawing Sheets

HMD APPARATUS WITH ADJUSTABLE EYE TRACKING DEVICE

CROSS REFERENCE TO RELATED APPLICATION

This application claims priority to European Patent Application No. EP 13 174 990 filed on Jul. 3, 2013, which is incorporated herein by reference in its entirety.

BACKGROUND

Field of Technology

The invention relates to an HMD apparatus with an imaging optical system for each of the two eyes of a user, which comprises at least one display unit to be viewed by the respective eye, as well as to a device for the acquisition of the viewing direction of at least one eye within a field of view of the display unit using an eye camera.

Brief Discussion of Related Art

So-called HMD [Head-Mounted Display] apparatuses are caps that can be placed on the head and that have two small monitor screens each of which is viewed with one eye of the user. Onto these monitor screens, a real or virtual environment is projected taking into consideration the different viewing angles of the two eyes. Furthermore, position changes of the HMD apparatuses are acquired, so that the represented image is changed accordingly. For example, when the user turns his/her head, the corresponding image is represented in this real or virtual direction. More recent HMD apparatuses, as disclosed in U.S. Pat. No. 6,433,760, for example, moreover acquire the eye movements of the user (so-called eye tracking system), in order to change, on the basis of this, the represented image analogously to the head movement toward the viewing direction relative to the head. The acquisition of the eye position or eye movement can occur by means of a camera that looks at an eye, wherein it is preferable for the position of the pupil to be determined by image processing. For this purpose, the eye is illuminated with infrared light, to which the camera is sensitive.

For an optimal position acquisition of the position of the eye, the camera has to acquire the entire eye, wherein the pupil representation in the "forward viewing" has to be as much in the center of the image section of the camera as possible. If an HMD apparatus with an eye tracking apparatus is used by only one person, an individual adaptation of the camera viewing direction can occur a single time, so that the required adjustment effort is not essential. On the other hand, if such an HMD apparatus is used by changing users having necessarily different facial features, such as distance between the eyes, nose and cheek shape, etc., then the rapid adaptation of the eye camera represents a problem.

SUMMARY

Therefore, the aim of the invention is to provide an HMD apparatus, which allows a rapid adaptation of the eye camera to different users.

According to the invention, this aim is achieved by several features. In particular, the aim is achieved by an HMD apparatus having an imaging optical system for each one of the eyes of the user, which comprises at least one display unit to be viewed by the respective eye, and which is provided with a device for the acquisition of the viewing direction of at least one eye within a field of view of the display unit using an eye camera, wherein the eye camera is provided with a camera holder which can be adjusted in terms of a peripheral angle around a viewing central axis of the field of view and in terms of a setting angle with respect to the viewing central axis.

The invention allows a rapid and sufficiently precise adjusting of the eye camera, so that the HMD apparatus according to the invention can be installed or prepared rapidly for use by different users, and then an optimal acquisition of the eye position can occur. Here, detailed attention is paid to the individual physical features as well as to the optimal horizontal alignment of the representation of the eye.

A substantial advantage among others is a rapid adaptation of the camera alignment, in order to ensure optimal recording by eye tracking software in as brief a time as possible. Moreover, there is no limitation with regard to the physiognomic features of the user resulting from the eye tracking system. In addition, the wearer comfort of the HMD apparatus is maintained, since the center of gravity of the HMD apparatus is not changed significantly. In addition, a user profile for the respective user can be established and applied, to which reference can be made quickly in order to shorten the adjusting process of the camera system. In addition to the individual user profiles, it is also possible to perform a rough preliminary adjustment of the camera with the help of face recognition software in the case of unregistered users. This would only entail an additional fine tuning of the system, in turn leading to a time saving for the adjusting process.

According to an advantageous variant of the invention, for the adjustment of the eye camera in terms of the peripheral direction, a peripheral position ring is provided, which surrounds the field of view and which is used for moving the camera holder. Such a peripheral position ring can be mounted in a space saving manner, in particular if, in front of the display unit, a lens is arranged, which preferably can be enclosed by the peripheral position ring.

According to an advantageous variant of the invention, the camera holder is manually adjustable along at least one section of the peripheral position ring. A manual adjustment is structurally simple and not failure-prone. Here it is preferable for the camera holder to be adjustable in discrete notch steps. The discrete notch steps entail only a slight worsening of the setting quality, but allow a reproducible setting. If, a certain position is determined and recorded for a given user, then the camera holder can be set in an uncomplicated manner later to this notch value.

According to an alternative advantageous variant of the invention, the camera holder is designed so that it can be adjusted continuously using an electric motor. An adjustment by the electric motor allows a rapid setting without manual mounting and thus without any risk of damage due to incorrect handling or dropping. In particular, in connection with a control device which evaluates the signal of the eye camera on a current basis and accordingly controls the adjustment by using the electric motor, a rapid camera setting can be achieved even by first users.

According to an advantageous variant of the invention, the camera holder is mounted on the setting angle unit, which enables movability of the eye camera with a setting angle in a plane that includes the viewing central axis. In this manner, as second parameter, it is possible to set the setting angle in addition to the peripheral angle, and thus to achieve an optimal camera alignment.

According to an advantageous variant, the setting angle unit is designed so that it can be manually adjusted in discrete notch steps. It is particularly preferable to provide a set of setting angle units for different setting angles, wherein the camera holder can be mounted detachably on a selectable setting angle unit, and the selectable setting angle unit can be mounted detachably on the peripheral position ring. Thus, as in the case of the setting of the peripheral position ring, a setting can be carried out reproducibly by selecting an appropriate setting angle unit.

Alternatively, it is also possible to design the setting angle unit in such a manner that different angles can be set either continuously or preferably in notch steps.

For example, for each user for whom a setting has been carried out once, the values for the setting of the peripheral position ring and for the setting angle unit can be stored, and a setting for this user can then be carried out particularly rapidly at a later time.

According to an alternative advantageous variant of the invention, the setting angle unit can be adjusted continuously using the electric motor. In particular, in connection with an adjustment by means of an electrical motor of the setting angle unit on the peripheral position ring, a largely automatic alignment of the eye camera can occur.

According to an advantageous variant of the invention, at least one display unit is provided for the illumination of the eye with infrared light for the eye camera. As a result, sufficient light is made available for the eye camera, since the interior of an HMD apparatus is usually shielded from ambient light in order to prevent impairment of vision. It is preferable to arrange three infrared LEDs mutually separated by 120° in a plane that perpendicularly intersects the viewing central axis. Said one or more illumination units can be adjusted preferably by using a control device in terms of the luminosity so that an image processing unit contained in the control device acquires the pupil as optimally as possible.

According to an advantageous variant of the invention with manual adjustment, a control unit is provided which evaluates the eye image recorded by the eye camera and determines correction values which are to be set manually and sends them out in the form of signals. In this manner, it is possible to display, in particular on the display unit, a point to be looked at that is arranged in the center. Using the representation of the pupil acquired by the eye camera, it is possible, in connection with a table stored in the control unit, to display correction values for the two parameters, namely the peripheral angle and the setting angle, on the display unit, for example. Then an optimal adjustment of the eye camera can be carried out by manual adjustment by the appropriate number of notch positions, or by substitution of the appropriate setting angle unit.

According to an alternative advantageous variant of the invention, the apparatus comprises two electrical actuating apparatuses for moving the setting angle unit along the peripheral position ring and for adjusting the eye camera by the setting angle unit, as well as a control unit which evaluates the eye image recorded by the eye camera and adjusts the operating apparatuses on this basis. Thus, after image processing, the image of the pupil recorded by the eye camera can be used for controlling, in a control circuit, the two electrical operating actuating apparatuses accordingly, and thus an optimal adjustment of the eye camera can occur very rapidly. In addition, if a change is observed during use, a readjustment can occur.

According to an advantageous variant of the invention, the HMD apparatus includes two eye cameras for the two eyes and appropriate adjusting devices for the eye cameras. Thus, on the basis of the acquired eye positions, an optimal determination of the viewing direction can occur, especially in the case of users with eye disorders that make it impossible to move the two eyes in the same way.

According to an alternative design of the invention, said design includes an adjustment apparatus for an HMD apparatus with an imaging optical system for each one of the eyes of a user, which comprises at least one display unit to be viewed by the respective eye, wherein this apparatus includes an eye camera for acquiring the viewing direction of at least one eye within a field of view of the display unit, and, furthermore, the eye camera is provided with a camera holder which is adjustable in terms of a peripheral angle around a viewing central axis of the field of view and in terms of a setting angle with respect to the viewing central axis of the HMD apparatus. Such a device can be mounted advantageously on an HMD apparatus without eye tracking function, that is to say without eye camera, and thus expand the range of features of said apparatus.

BRIEF DESCRIPTION OF THE DRAWINGS

The invention is further explained below in reference to the appended drawings, in which.

DETAILED DESCRIPTION

Figure 1:
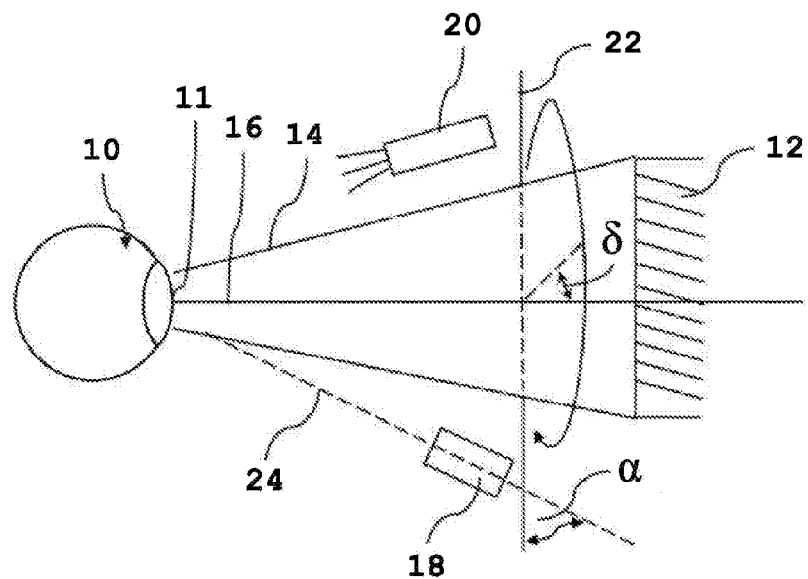
FIG. 1 shows a diagrammatic representation of the beam path in an HMD display.

In FIG. 1, an eye 10 with a pupil 11, of the user of an HMD apparatus not represented in further detail and a display unit 12 are represented. The HMD apparatus is usually in the form of oversized glasses or a cap or a helmet, in order to immobilize the display units 12 located in front of the two eyes 10 with respect to the head of the user so that, in the case of movements of the head, the display units 12 always remain in the same position with respect to the head or the eyes 10. The display unit 12 for each eye 10 usually includes a small monitor screen, in most cases with a lens arranged in front. The display unit 12 here defines a field of view 14 having a viewing central axis 16.

The eye camera 18 is used to acquire the position of the pupil 11 with respect to the eye 10, in order to determine, in the context of image processing, where the pupil 11 is located or in which direction the user is looking. At least one eye illumination device 20 is provided in order to illuminate the eye 10. It is preferable to provide three infrared LEDs distributed regularly over the periphery of the field of view 14, in order to ensure the most uniform illumination of the eye 10 possible.

It is important for the eye camera 18 to have the most optimal possible view of the eye 10, which means a positioning of the pupil 11 looking "forward" as much as possible in the center in the recorded image section. For this purpose, the position of the eye camera 18 can be changed with two parameters with respect to the viewing central axis 16, first, the peripheral angle δ in a plane 22 is perpendicular to the viewing central axis 16, and, second, the setting angle a, which the central axis 24 of eye camera 18 of the plane 22 includes.

Figure 2:
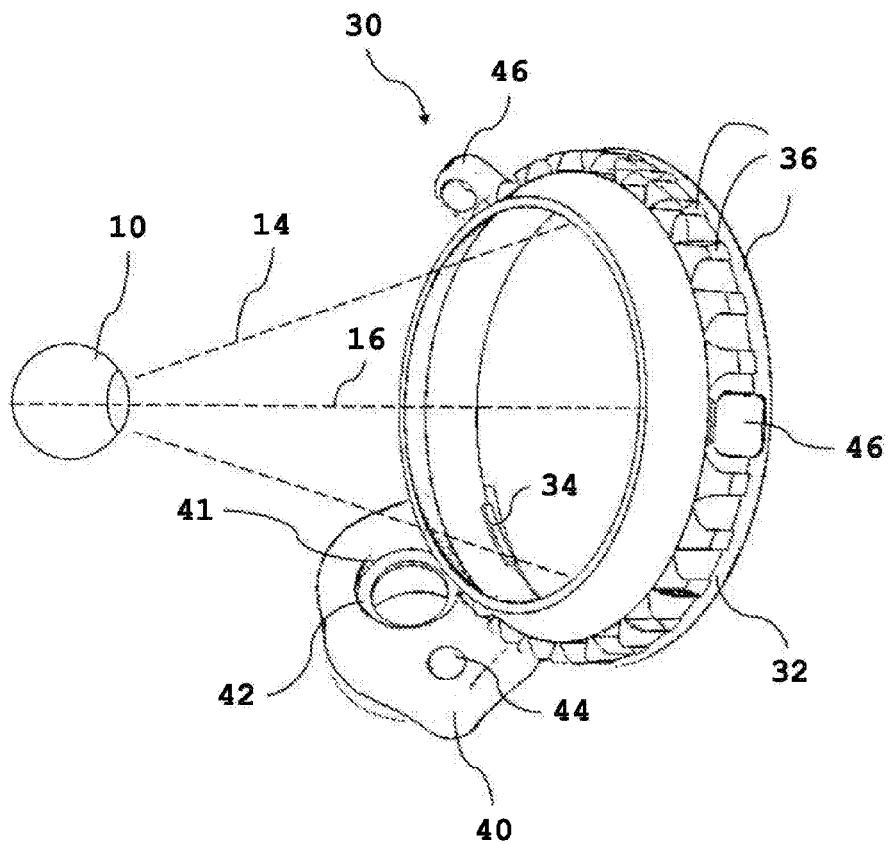
FIG. 2 shows a perspective representation of a device for the adjustment of an eye camera in terms of two angles.

FIG. 2 shows a perspective representation of a preferred design of the invention in the form of an apparatus 30 for adjusting an eye camera 18 in terms of two angles. This apparatus includes a peripheral position ring 32 which encloses the field of view 14, and preferably a lens—not shown—of an HMD apparatus—not shown—or which is attached thereto, for example, by gluing or by locking projections 34 that engage behind such a lens. On the periphery of the peripheral position ring 32, distributed swallowtail grooves 36 are formed in the represented embodiment, into which appropriately shaped swallowtail counterpieces 38 can be inserted from the viewing central axis 16. A setting angle unit 40—which is shown from another perspective in FIG. 3—comprises such swallowtail counterpieces 38 which can allow said setting angle unit to be mounted on the peripheral position ring 32. In the represented embodiment, thirty two swallowtail grooves 36 are formed, so that the setting angle unit 40 can be inserted in thirty two different positions with correspondingly thirty two different angles δ. Naturally, it is also possible to provide more than or fewer than thirty two swallowtail grooves 36 or to provide securing shapes other than swallowtail shape.

The setting angle unit 40 comprises, in addition to the swallowtail counterpieces 38, a camera holder-receiving port 41 for receiving a camera holder 42 which receives an eye camera 18 not represented in FIG. 2. Furthermore, a holding bore 44 for an LED for illuminating the eye 10 with infrared light is represented.

Furthermore, it is preferable to provide two separate LED holders 46 for holding LEDs—not shown—which also comprise swallowtail counterpieces which are also not shown (analogously to the swallowtail counterpieces 38 shown in FIG. 3) and which can be inserted into suitable swallowtail grooves 36. In the represented embodiment, the two LED holders 46 are separated, relative to the camera holder-receiving port 41, by 120° with respect to the viewing central axis 16, in order to achieve an optimal illumination of the eye 10.

Figure 3:
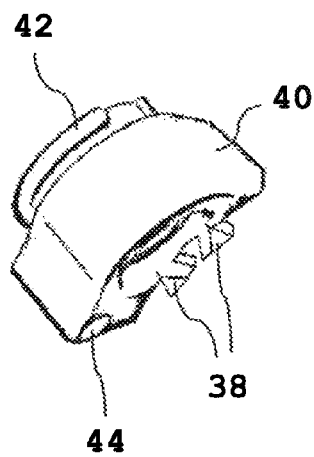
FIG. 3 shows a perspective representation of a setting angle unit.

FIGS. 2 and 3, only one embodiment of a setting angle unit 40 is represented, which allows an alignment of the eye camera 18 at a particular setting angle with respect to the viewing central axis 16. Therefore, it is preferable to provide a set of different setting angle units 40, which differ in terms of the setting angle, and are thus designed for different setting angles α.

For the setting of the eye camera 18, first a base setting for the two angles is carried out or the existing setting is used. On the display unit 12, suitable markings are applied for this purpose, at which the user has to stare. Subsequently, the position of the pupil 11 is acquired by the eye camera 18 and evaluated in a control unit. On the basis of the measured deviation of the pupil 11 from the center of the image, a determination is made, preferably based on a stored table, as to which changes of the two parameters (peripheral angle and setting angle) are required. The user is provided, preferably by display in the display unit 12, either with incremental data, that is to say data showing by how much the respective angle has to be changed, or with absolute values of the angles to be set. For example, the different setting angle units 40 can be numbered consecutively and in that case only the corresponding reference number has to be issued. Likewise, it is appropriate to provide the swallowtail grooves 36 with markings, in particular numbers.

After the removal of the HMD apparatus, the setting angle unit 40 is then simply pulled out axially from the peripheral position ring 32; furthermore, the camera holder 42 with a mounted eye camera 18 is also removed axially from the camera holder-receiving port 41. Another setting angle unit 40 with the correct setting angle a is taken, and the camera holder 42 with mounted eye camera 18 is inserted in the camera holder-receiving port 41. Subsequently, in accordance with the predetermined peripheral angle setting, the setting angle unit 40 with its swallowtail counterpieces 38 is inserted into the correct swallowtail grooves 36. It is preferable for the LED holders 46 to be then also reinserted accordingly.

Figure 4:
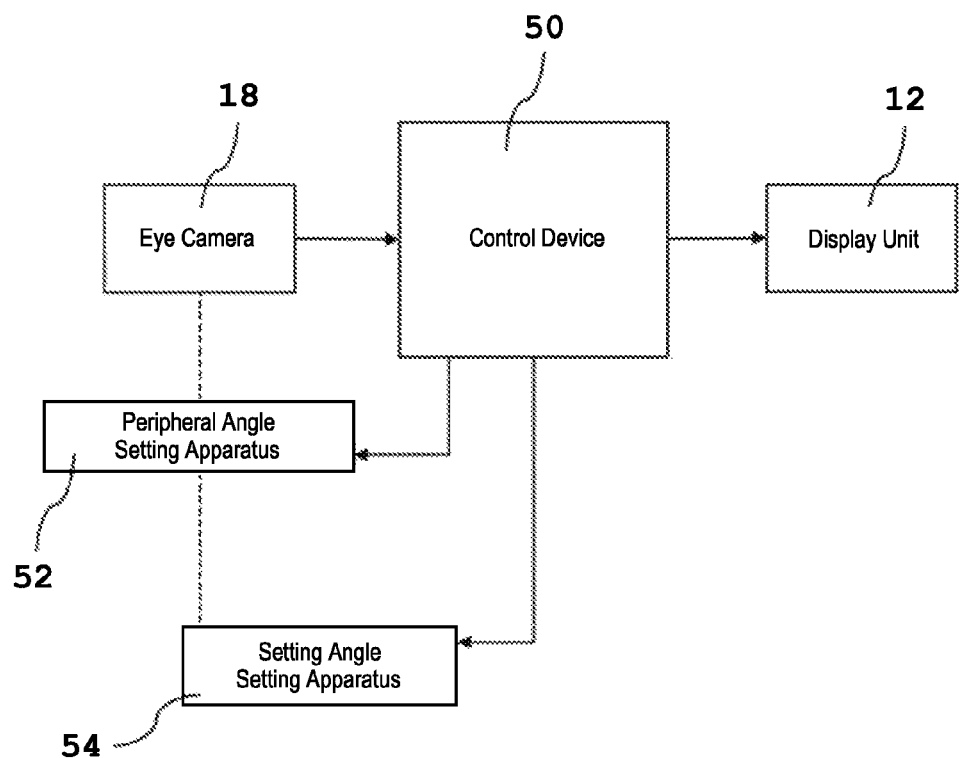
FIG. 4 shows a block diagram representation of a control device.

In FIG. 4, a block diagram of a control device 50 is represented, control device which is supplied by the eye camera 18 and evaluates the image thereof. In particular, the control device 50 includes image processing software in order to determine the position of the pupil 11 from the image recorded by the eye camera 18. For the normal operation of the HMD apparatus, the control unit calculates the alignment of the pupil 11 and it provides the appropriate signal for corresponding applications, for example, the representation of a virtual environment on the display unit 12.

In an embodiment having a drive using an electromotor for setting the setting angles α and peripheral angles δ, an electromotor-driven peripheral angle setting apparatus 52 and an electromotor-driven setting angle-setting apparatus 54 are provided. During the setting phase of the eye camera 18, the adjusting apparatuses 52, 54 are activated in such a manner that the eye camera 18 is adjusted accordingly, so that the pupil image generated is arranged in the center of the image.

The invention claimed is:

1. A head-mounted display (HMD) apparatus comprising: an imaging optical system for an eye of a user, the imaging optical system comprising a display unit to be viewed by the eye of the user, and a control device to acquire a viewing direction of the eye of the user within a field of view of the display unit using an eye camera;
   a camera holder to receive the eye camera, the camera holder being selectively adjustable in relationship to the display unit to vary an orientation of the eye camera in terms of a peripheral angle around a viewing central axis of the field of view and in terms of a setting angle with respect to the viewing central axis;
   a peripheral position ring that surrounds the field of view; and
   a setting angle unit for different setting angles, the camera holder mountable detachably on the setting angle unit to selectively adjust the setting angle, the setting angle unit mountable detachably on the peripheral position ring and adjustable in discrete notch steps along the peripheral position ring to selectively adjust the peripheral angle.

2. The HMD apparatus according to claim 1, wherein the camera holder is manually adjustable along at least one section of the peripheral position ring.

3. The HMD apparatus according to claim 2, wherein the camera holder is manually adjustable in discrete notch steps.

4. The HMD apparatus according to claim 3, wherein the control device is to evaluate an eye image recorded by the eye camera and to determine correction values that are settable, the control device further to send the correction values as signals.

5. The HMD apparatus according to claim 1, wherein the camera holder is continuously adjustable.

6. The HMD apparatus according to claim 5, wherein the apparatus comprises a peripheral angle setting apparatus to move the setting angle unit along the peripheral position ring, the control device to evaluate an eye image recorded by the eye camera and to set the peripheral angle setting apparatus based on the evaluation.

7. The HMD apparatus according to claim 1, wherein the setting angle unit is continuously adjustable.

8. The HMD apparatus according to claim 7, wherein the apparatus comprises a setting angle setting apparatus to adjust the eye camera by using the setting angle unit, the control device further to evaluate an eye image recorded by the eye camera and to set the setting angle setting apparatus based on the evaluation.

9. The HMD apparatus according to claim 1, wherein the apparatus comprises at least one illumination unit to illuminate the eye of the user with infrared light for the eye camera.

10. The HMD apparatus according to claim 1, wherein the control device to evaluate an eye image recorded by the eye camera and to determine correction values that are settable, the control device further to send the correction values as signals.

11. An adjustment apparatus for a head-mounted display (HMD) apparatus, the HMD apparatus comprising an imaging optical system for an eye of a user, the imaging optical system comprising a display unit to be viewed by the eye of the user, the adjustment apparatus comprising:

an eye camera to acquire an eye image for acquisition of a viewing direction of the eye of the user within a field of view of the display unit;

a camera holder to receive the eye camera, the camera holder being selectively adjustable in relationship to the display unit to vary an orientation of the eye camera in terms of a peripheral angle around a viewing central axis of the field of view and in terms of a setting angle with respect to the viewing central axis;

a peripheral position ring that surrounds the field of view; and a setting angle unit for different setting angles, the camera holder mountable detachably on the setting angle unit to selectively adjust the setting angle, the setting angle unit mountable detachably on the peripheral position ring and adjustable in discrete notch steps along the peripheral position ring to selectively adjust the peripheral angle.

* * * * *